United States Patent
Baba et al.

(10) Patent No.: US 8,242,916 B2
(45) Date of Patent: Aug. 14, 2012

(54) RFID TAG

(75) Inventors: Shunji Baba, Kawasaki (JP); Shigeru Hashimoto, Inagi (JP); Tsuyoshi Niwata, Inagi (JP)

(73) Assignees: Fujitsu Limited, Kawasaki (JP); Fujitsu Frontech Limited, Inagi-shi (JP)

( * ) Notice: Subject to any disclaimer, the term of this patent is extended or adjusted under 35 U.S.C. 154(b) by 382 days.

(21) Appl. No.: 12/694,755

(22) Filed: Jan. 27, 2010

(65) Prior Publication Data
US 2010/0214101 A1    Aug. 26, 2010

(30) Foreign Application Priority Data

Feb. 24, 2009    (JP) .................................. 2009-040269

(51) Int. Cl.
- G08B 13/14 (2006.01)
- G06K 7/00 (2006.01)
- B43K 25/00 (2006.01)
- A44B 1/04 (2006.01)
- E05B 73/00 (2006.01)

(52) U.S. Cl. ................ 340/572.9; 340/572.1; 340/572.8; 235/486; 24/11 R; 24/316; 70/19

(58) Field of Classification Search ............... 340/572.1, 340/572.8, 572.9; 235/486; 24/11 R, 316; 70/19
See application file for complete search history.

(56) References Cited

U.S. PATENT DOCUMENTS

| 7,404,522 B2 | 7/2008 | Kawai | |
|---|---|---|---|
| 7,652,579 B2 * | 1/2010 | Keyaki et al. | 340/572.8 |
| 7,821,403 B2 * | 10/2010 | Hogan et al. | 340/572.9 |

FOREIGN PATENT DOCUMENTS

| JP | 2000-48147 A | 2/2000 |
|---|---|---|
| JP | 3636202 B2 | 4/2005 |
| JP | 2005-242971 A | 9/2005 |

* cited by examiner

*Primary Examiner* — Benjamin C Lee
*Assistant Examiner* — Omeed Alizada
(74) *Attorney, Agent, or Firm* — Westerman, Hattori, Daniels & Adrian, LLP

(57) ABSTRACT

An RFID tag has an IC chip and an antenna connected to the IC chip, the RFID tag including: a spacer that has elasticity; a first locking section that is formed around the IC chip; a second locking section that is arranged in a position apart from the first locking section across the spacer, is displaced toward the first locking section and locked on the first locking section by pressing force with which the spacer is pressed, and applies reactive force against the pressing force around the IC chip via the first locking section when the pressing force is removed; and a destruction section that destroys the IC chip or the antenna with the reactive force from the second locking section.

10 Claims, 15 Drawing Sheets

RFID TAG

CROSS-REFERENCE TO RELATED APPLICATIONS

This application is based upon and claims the benefit of priority of the prior Japanese Patent Application No. 2009-040269, filed on Feb. 24, 2009, the entire contents of which are incorporated herein by reference.

FIELD

The present invention relates to a radio frequency identification (RFID) tag which has an IC chip and an antenna connected to the integrated circuit (IC) chip.

BACKGROUND

In order to prevent the unauthorized use of RFID tag, technologies are known in which an RFID tag, once attached to an intended article, is destroyed by the removal of only an upper part of the RFID tag.
[Patent Document 1] Japanese Laid-Open Patent Publication No. 2000-48147
[Patent Document 2] Japanese Laid-Open Patent Publication No. 2005-242971
[Patent Document 3] Japanese Patent No. 3,636,202

The foregoing RFID tag for preventing unauthorized use needs to be bonded to an intended article. The RFID tag is therefore not applicable to one that is not bonded to the intended articles. Moreover, the RFID tag for preventing unauthorized use becomes ineffective if the RFID tag is taken off from the intended article.

SUMMARY

According to an aspect of the invention, an RFID tag has an IC chip and an antenna connected to the IC chip, the RFID tag including: a spacer that has elasticity; a first locking section that is formed around the IC chip; a second locking section that is arranged in a position apart from the first locking section across the spacer, is displaced toward the first locking section and locked on the first locking section by pressing force with which the spacer is pressed, and applies reactive force against the pressing force around the IC chip via the first locking section when the pressing force is removed; and a destruction section that destroys the IC chip or the antenna with the reactive force from the second locking section.

The object and advantages of the invention will be realized and attained by means of the elements and combinations particularly pointed out in the claims It is to be understood that both the foregoing general description and the following detailed description are exemplary and explanatory and are not restrictive of the invention, as claimed.

BRIEF DESCRIPTION OF DRAWINGS

FIG. 1 is a bottom view illustrating an example of the configuration of an RFID tag 1a;
FIG. 2 is a front view illustrating the example of the configuration of the RFID tag 1a;
FIG. 3 is a top view illustrating an example of the state of attachment of the RFID tag 1a;
FIG. 4 is a front view illustrating the example of the state of attachment of the RFID tag 1a;
FIG. 7 is a bottom view illustrating an example of the configuration in the vicinity of the destruction mechanism 13a;
FIG. 8 is a side view illustrating the example of the configuration in the vicinity of the destruction mechanism 13a;
FIG. 12 is a bottom view illustrating an example of a first step in the method of manufacturing the RFID tag 1a;
FIG. 13 is a side view illustrating the example of the first step in the method of manufacturing the RFID tag 1a;
FIG. 14 is a bottom view illustrating an example of a second step in the method of manufacturing the RFID tag 1a;
FIG. 15 is a side view illustrating the example of the second step in the method of manufacturing the RFID tag 1a;
FIG. 16 is a bottom view illustrating an example of a third step in the method of manufacturing the RFID tag 1a;
FIG. 17 is a side view illustrating the example of the third step in the method of manufacturing the RFID tag 1a;
FIG. 18 is a bottom view illustrating an example of a fourth step in the method of manufacturing the RFID tag 1a;
FIG. 19 is a side view illustrating the example of the fourth step in the method of manufacturing the RFID tag 1a;
FIG. 20 is a sectional view illustrating an example of a fifth step in the method of manufacturing the RFID tag 1a;
FIG. 26 is a perspective view illustrating an example of the configuration of the destruction mechanism 13b and the inlet substrate 12a.

DESCRIPTION OF EMBODIMENTS

Hereinafter, embodiments of the present invention will be described with reference to the drawings.

Embodiment 1

Figure 1:
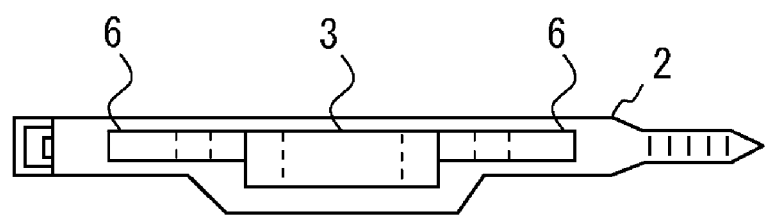
Figure 2:
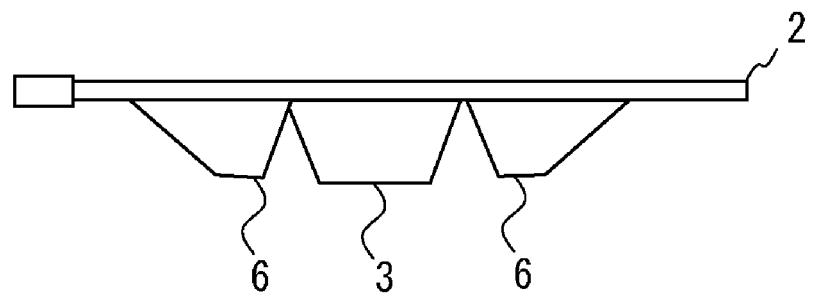

The configuration of an RFID tag 1a according to the present embodiment will be described below.
FIG. 1 is a bottom view illustrating an example of the configuration of the RFID tag 1a. FIG. 2 is a front view illustrating the example of the configuration of the RFID tag 1a. The RFID tag 1a of the present embodiment includes an attaching band 2, a circuit accommodating section 3, and spacers 6. The attaching band 2 has two ends that can be connected to each other, with the same function as that of a cable tie. The circuit accommodating section 3 has walls which constitute a spacer 7.

Figure 3:
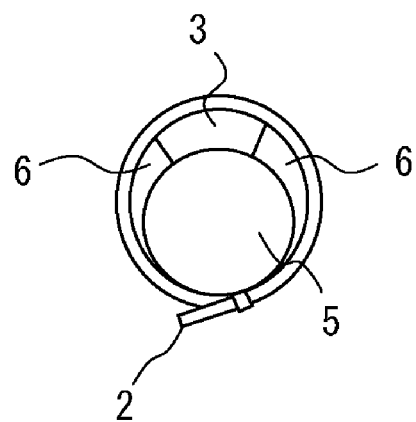
Figure 4:
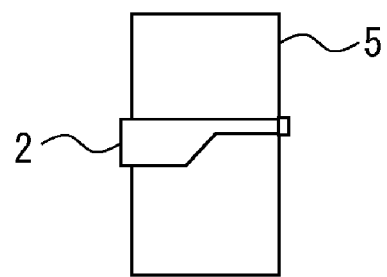

FIG. 3 is a top view illustrating an example of the state of attachment of the RFID tag 1a. FIG. 4 is a front view illustrating the example of the state of attachment of the RFID tag 1a. The RFID tag 1a is attached to an object of attachment 5. Here, the attaching band 2 is wound around and fastened to the object of attachment 5, whereby the circuit accommodating section 3 and the spacers 6 are compressed.

Figure 5:
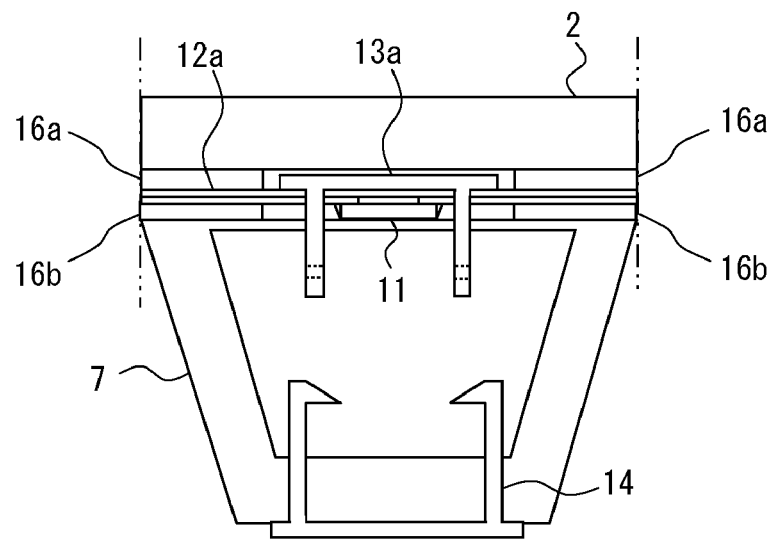
FIG. 5 is a sectional view illustrating an example of the configuration of the RFID tag 1a as seen from the front.

FIG. 5 is a sectional view illustrating an example of the configuration of the RFID tag 1a as seen from the front. The diagram depicts the interior of the circuit accommodating section 3 of the RFID tag 1a. The circuit accommodating section 3 includes a chip 11 (IC chip), an inlet substrate 12a, destruction mechanisms 13a and 14, the spacer 7, and adhesive agents 16a and 16b. Of the wall surfaces of the spacer 7, the upper wall surface in contact with the inlet substrate 12a will be referred to as a top wall, the lower wall surface to be bonded to the destruction mechanism 14 as a bottom wall, and the remaining wall surfaces as side walls. The spacers 6 and 7 are made of an elastic body such as rubber. The spacers 6 and 7 may be coil springs or flat springs.

The area of the inlet substrate 12a in contact with the destruction mechanism 13a will be referred to as a center portion (first location). The areas to be bonded to the attaching band 2 will be referred to as end portions (second location). The top surface of the chip 11 is bonded to the bottom surface of the center portion of the inlet substrate 12a. The chip 11 has electrodes which are connected to an antenna pattern on the inlet substrate 12a. The bottom surfaces of both end portions of the inlet substrate 12a are bonded to the top surface of the top wall of the spacer 7 by the adhesive agent 16b. The top surfaces of both end portions of the inlet substrate 12a are bonded to the bottom surface of the attaching band 2 by the adhesive agent 16a.

Figure 6:
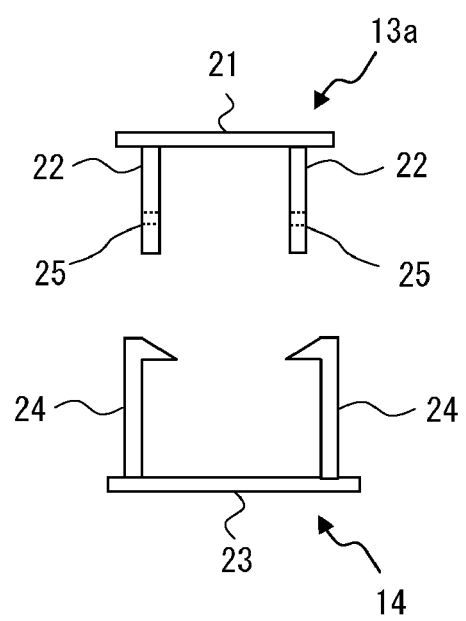
FIG. 6 is a front view illustrating an example of the configuration of destruction mechanisms 13a and 14.

FIG. 6 is a front view illustrating an example of the configuration of the destruction mechanisms 13a and 14. In the diagram, the upper member represents the destruction mechanism 13a, and the lower the destruction mechanism 14.

The destruction mechanism 13a has a base 21 and hooks 22. The base 21 and the hooks 22 are joined to each other. The base 21 is fixed to the top surface of the center portion of the inlet substrate 12a. The hooks 22 are extended through the inlet substrate 12a into the internal space of the spacer 7. The destruction mechanism 13a is not joined to the attaching band 2.

The destruction mechanism 14 has a base 23 and hooks 24. The base 23 and the hooks 24 are joined to each other. The base 23 is fixed to the bottom surface of the bottom wall of the spacer 7. The hooks 24 are extended through the bottom wall of the spacer 7 into the internal space of the spacer 7.

The hooks 22 have hook holes 25 for the protrusions of the hooks 24 to catch in.

Figure 7:
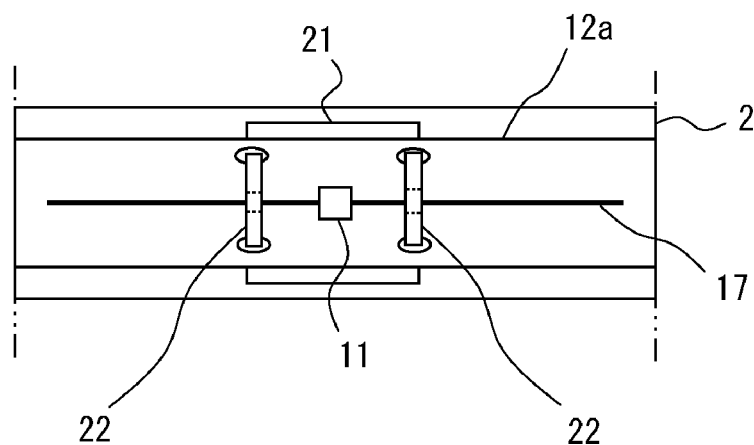
Figure 8:
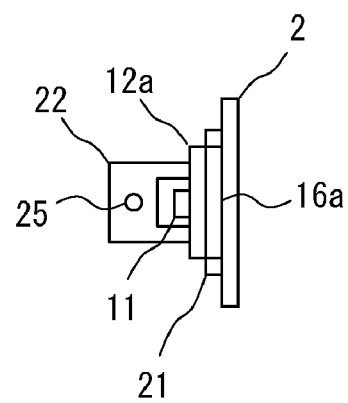

FIG. 7 is a bottom view illustrating an example of the configuration in the vicinity of the destruction mechanism 13a. The diagram depicts the attaching band 2, the destruction mechanism 13a, the inlet substrate 12a, and the chip 11 of the RFID tag 1a. FIG. 8 is a side view illustrating the example of the configuration in the vicinity of the destruction mechanism 13a. This diagram is a side view taken from the right of FIG. 7. The left of the diagram corresponds to below the inlet substrate 12a. The inlet substrate 12a has an antenna pattern 17 (antenna).

Hereinafter, description will be given of a change in the state of the RFID tag 1a when attached.

Figure 9:
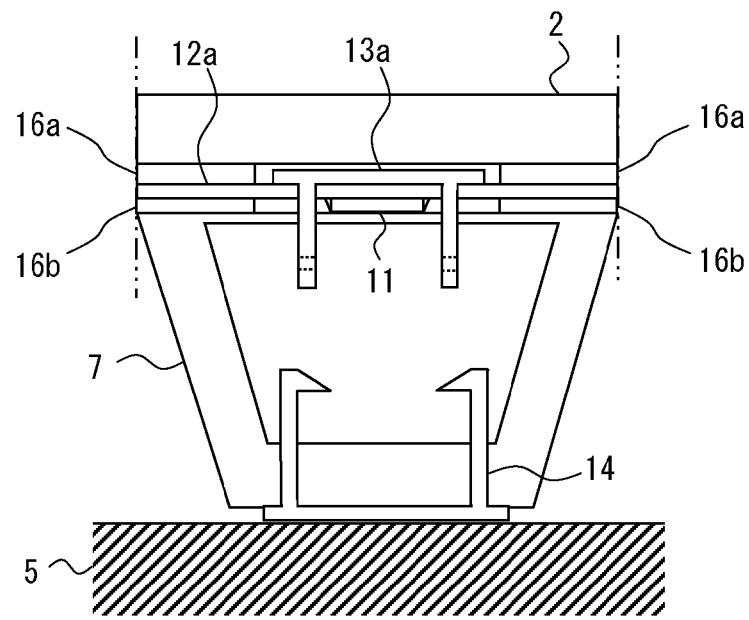
FIG. 9 is a sectional view illustrating an example of a first state of the RFID tag 1a as seen from the front.

FIG. 9 is a sectional view illustrating an example of a first state of the RFID tag 1a as seen from the front. The first state refers to where the RFID tag 1a is yet to be attached to the object of attachment 5, and the bottom surface of the bottom wall of the spacer 7 is in contact with the object of attachment 5.

Figure 10:
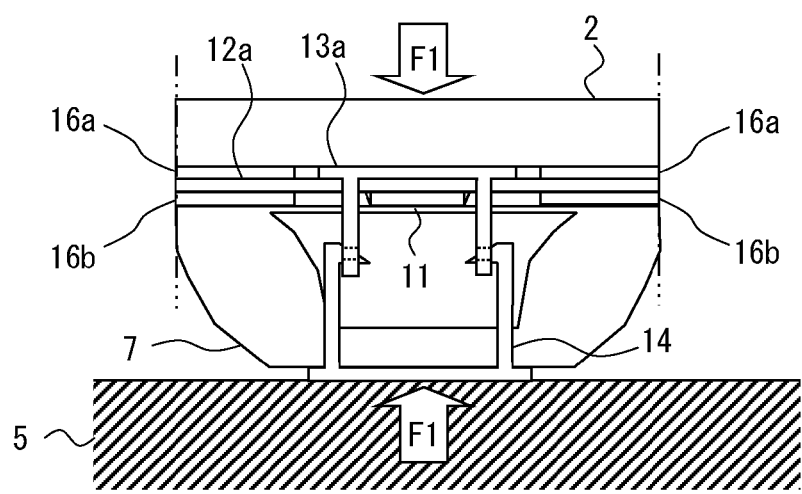
FIG. 10 is a sectional view illustrating an example of a second state of the RFID tag 1a as seen from the front.

FIG. 10 is a sectional view illustrating an example of a second state of the RFID tag 1a as seen from the front. The second state is where the attaching band 2 is fastened by an operator so that the RFID tag 1a is attached to the object of attachment 5. When fastened, the attaching band 2 is pressed against the object of attachment 5, so that the RFID tag 1a undergoes pressing force F1 that presses the base 21 toward the base 23 as well as the base 23 toward the base 21. The pressing force F1 compresses the spacer 7 for elastic deformation, whereby the hooks 22 and the hooks 24 are locked on each other.

Hereinafter, description will be given of a change in the state of the RFID tag 1a when detached.

Figure 11:
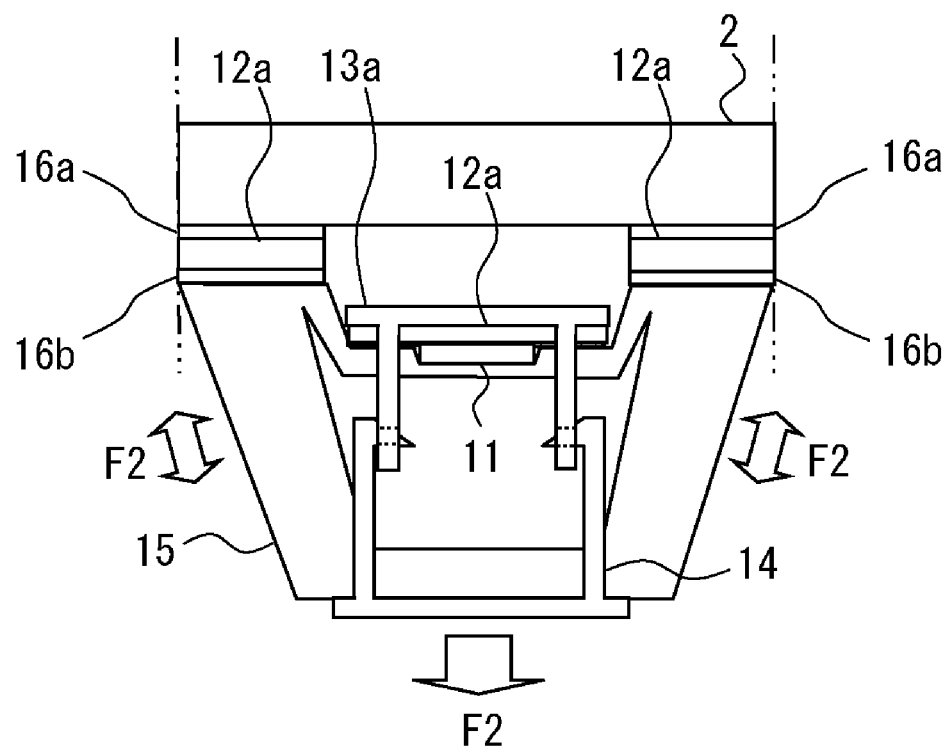
FIG. 11 is a sectional view illustrating an example of a third state of the RFID tag 1a as seen from the front.

FIG. 11 is a sectional view illustrating an example of a third state of the RFID tag 1a as seen from the front. The third state is where the RFID tag 1a attached is detached from the object of attachment 5. The spacer 7 produces elastic restoring force (reactive force) F2 against the pressing force F1.

When the attaching band 2 is cut or otherwise loosened and the fastening force of the attaching band 2 decreases to reduce the pressing force F1, the RFID tag 1a is subjected to the elastic restoring force F2 which presses both end portions of the inlet substrate 12a upward and the base 23 downward. In the meantime, the distance between the center portion of the inlet substrate 12a and the base 23 is maintained because the bases 21 and 23 are constrained with the hooks 22 and 24 locked on each other. As a result, the center portion and both end portions of the inlet substrate 12a undergo the forces in the opposite directions, which destroy the inlet substrate 12a and the antenna pattern 17.

The elastic restoring force F2 exceeds the strength of the inlet substrate 12a.

Since the destruction mechanisms 13a and 14 are covered with the spacer 7, an operator who detaches the RFID tag 1a from the object of attachment 5 in an unauthorized fashion is not able to learn of the destruction mechanisms 13a and 14 from the appearance.

Description will now be given of the method of manufacturing the RFID tag 1a.

Figure 12:
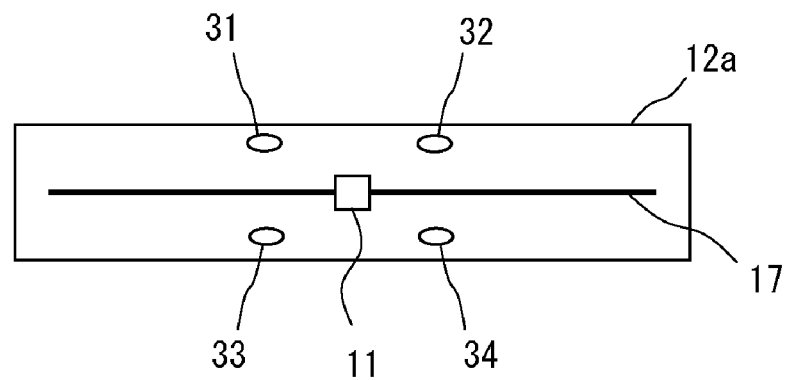
Figure 13:
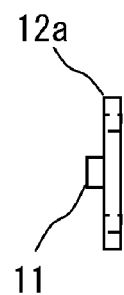

FIG. 12 is a bottom view illustrating an example of a first step in the method of manufacturing the RFID tag 1a. FIG. 13 is a side view illustrating the example of the first step in the method of manufacturing the RFID tag 1a. In the first step, holes 31, 32, 33, and 34 are formed through the center portion of the inlet substrate 12a. The chip 11 is mounted on the bottom surface of the center portion of the inlet substrate 12a.

Figure 14:
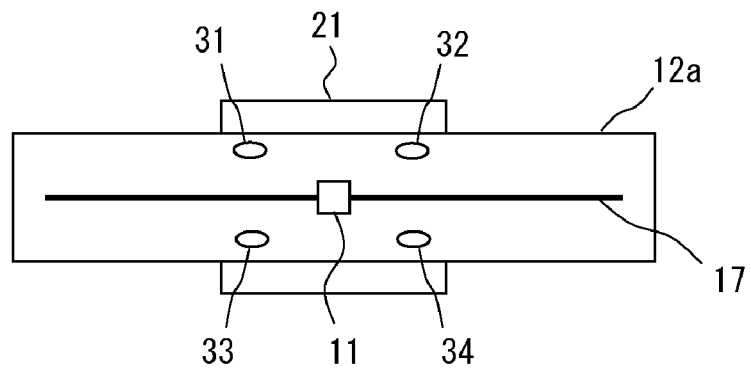
Figure 15:
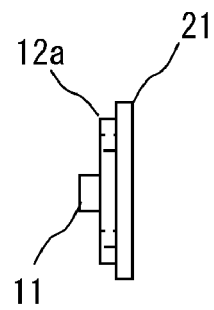

FIG. 14 is a bottom view illustrating an example of a second step in the method of manufacturing the RFID tag 1a. FIG. 15 is a side view illustrating the example of the second step in the method of manufacturing the RFID tag 1a. The base 21 is arranged on the top surface of the center portion of the inlet substrate 12a.

Figure 16:
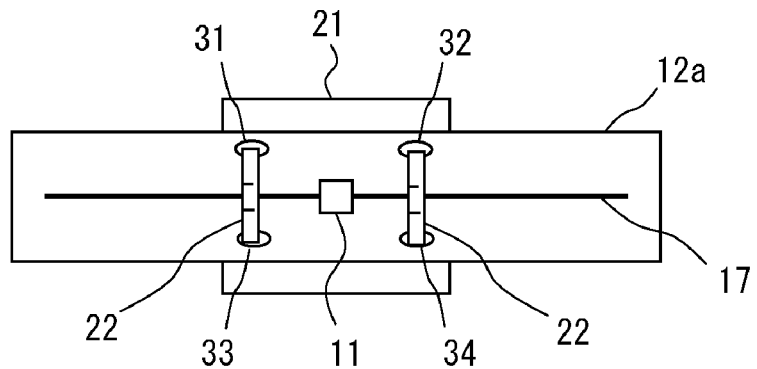
Figure 17:
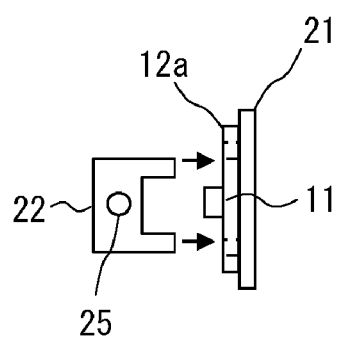

FIG. 16 is a bottom view illustrating an example of a third step in the method of manufacturing the RFID tag 1a. FIG. 17 is a side view illustrating the example of the third step in the method of manufacturing the RFID tag 1a. The hooks 22 are arranged on the bottom surface of the center portion of the inlet substrate 12a. The base 21 and the hooks 22 are joined to each other.

Figure 18:
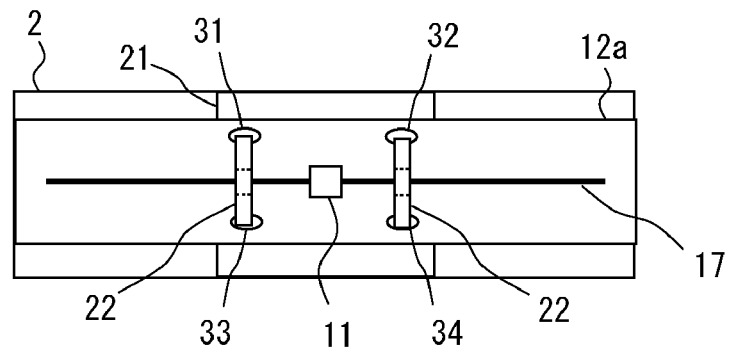
Figure 19:
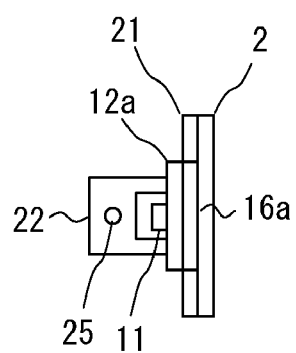

FIG. 18 is a bottom view illustrating an example of a fourth step in the method of manufacturing the RFID tag 1a. FIG. 19 is a side view illustrating the example of the fourth step in the method of manufacturing the RFID tag 1a. The attaching band 2 is arranged on the top surface of the inlet substrate 12a. The top surfaces of both end portions of the inlet substrate 12a are bonded to the bottom surface of the attaching band 2 by the adhesive agent 16a. The base 21 and the attaching band 2 are not bonded to each other.

Figure 20:
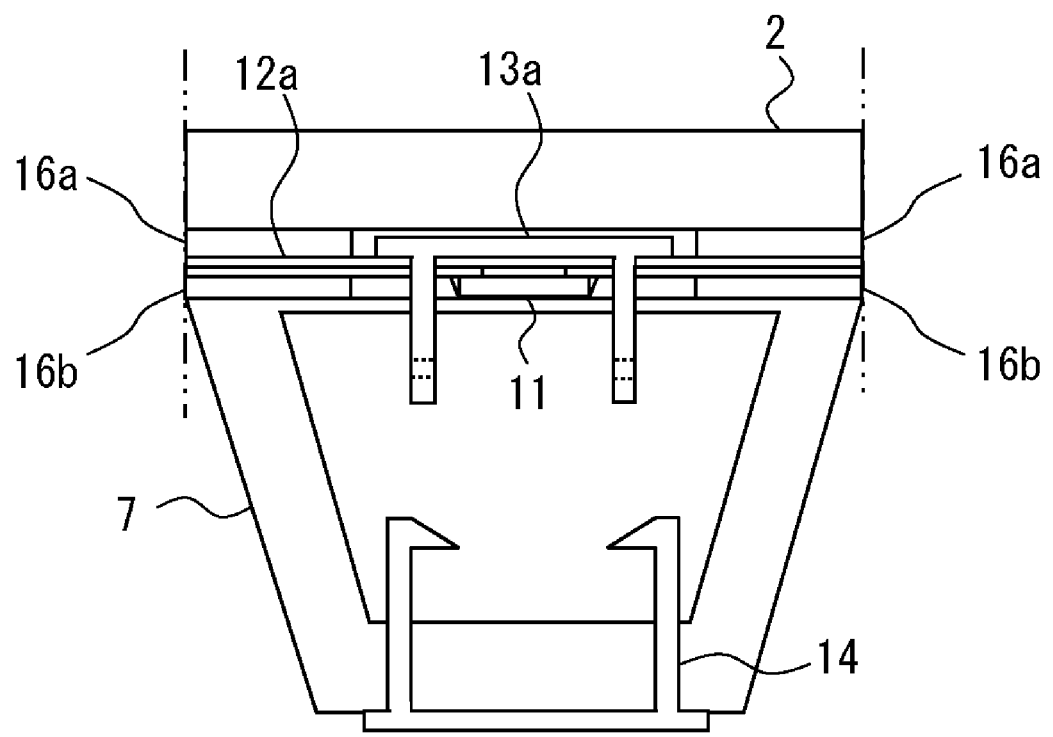

FIG. 20 is a sectional view illustrating an example of a fifth step in the method of manufacturing the RFID tag 1a. The spacer 7 with the destruction mechanism 14 on its bottom wall is arranged on the bottom surface of the inlet substrate 12a. The bottom surfaces of both end portions of the inlet substrate 12a are bonded to the top surface of the top wall of the spacer 7 by the adhesive agent 16b.

According to the present embodiment, the inlet substrate 12a is destroyed when the RFID tag 1a attached to the object of attachment 5 is detached. This makes it possible to prevent the unauthorized use of the RFID tag 1a.

Measures for preventing malfunction of the RFID tag 1a will be described below.

Figure 21:
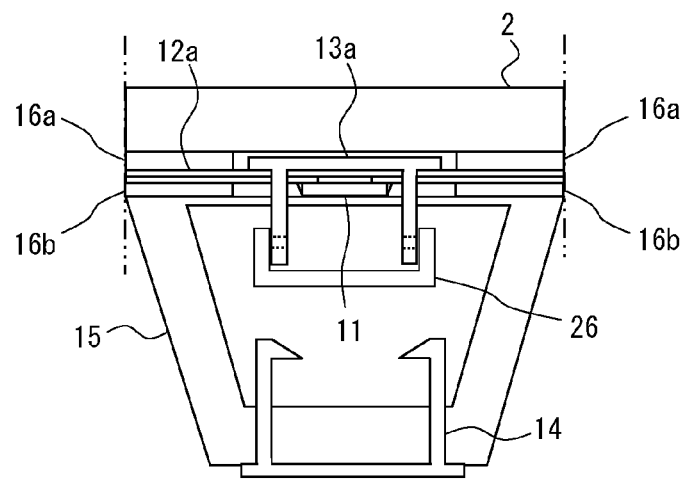
FIG. 21 is a sectional view illustrating an example of the RFID tag 1a with malfunction preventive measures as seen from the front.

FIG. 21 is a sectional view illustrating an example of the RFID tag 1a with malfunction preventive measures as seen from the front. A stopper 26 is put on the hooks 22 to stop the hook holes 25 after manufacturing until attachment so that the hooks 22 and 24 will not lock into each other due to a shock or impact during shipment. The stopper 26 is removed immediately before attachment.

Alternatively, the stopper 26 may be put on the hooks 24. The stoppers 26 may be put on both the hooks 22 and 24.

Embodiment 2

Hereinafter, description will be given of the configuration of an RFID tag 1b according to the present embodiment.

Figure 22:
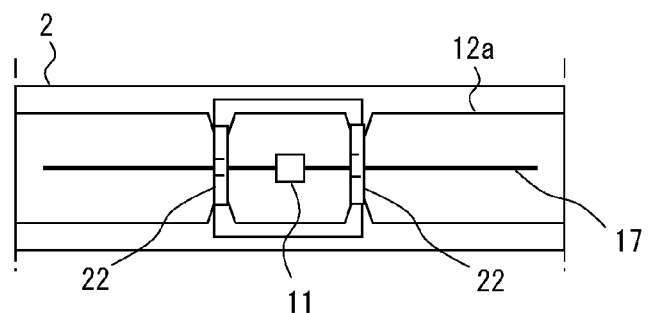
FIG. 22 is a bottom view illustrating an example of the configuration of an RFID tag 1b.

FIG. 22 is a bottom view illustrating an example of the configuration of the RFID tag 1b. The components of the RFID tag 1b identical or equivalent to those of the RFID tag 1a will be designated by the same reference numerals as those of the RFID tag 1a. Description thereof will be omitted here. As compared to the RFID tag 1a, the RFID tag 1b has an inlet substrate 12b instead of the inlet substrate 12a.

Figure 23:
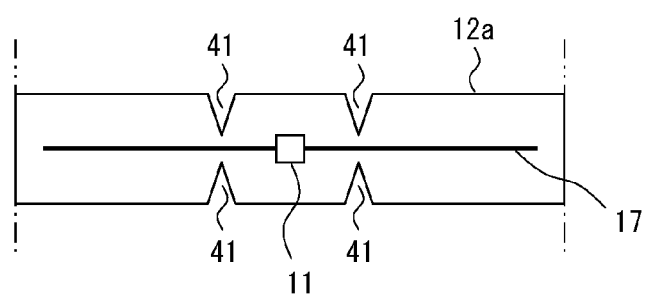
FIG. 23 is a bottom view illustrating an example of the configuration of an inlet substrate 12b.

FIG. 23 is a bottom view illustrating an example of the configuration of the inlet substrate 12b. As compared to the inlet substrate 12a, the inlet substrate 12b has four notches (grooves) 41 at the borders between the center portion and both end portions. The notches 41 are intended to lower the strength of the borders. When the RFID tag 1b reaches the third state through the first and second states as in Embodiment 1, the notches 41 increase the certainty of destruction of the inlet substrate 12b. The notches 41 are formed in the long sides of the plane of the inlet substrate 12b so as to extend in the direction of the borders.

Alternatively, grooves may be formed in the surface of the inlet substrate along the borders so that the grooves ensure the destruction. The grooves may be formed in either of the top and bottom surfaces. The notches 41 in the long sides of the plane of the inlet substrate and the grooves in the surface of the inlet substrate may be used in combination.

According to the present embodiment, the inlet substrate 12b is destroyed with higher reliability when the RFID tag 1b attached to the object of attachment 5 is detached.

Embodiment 3

Now, description will be given of the configuration of an RFID tag 1c according to the present embodiment.

Figure 24:
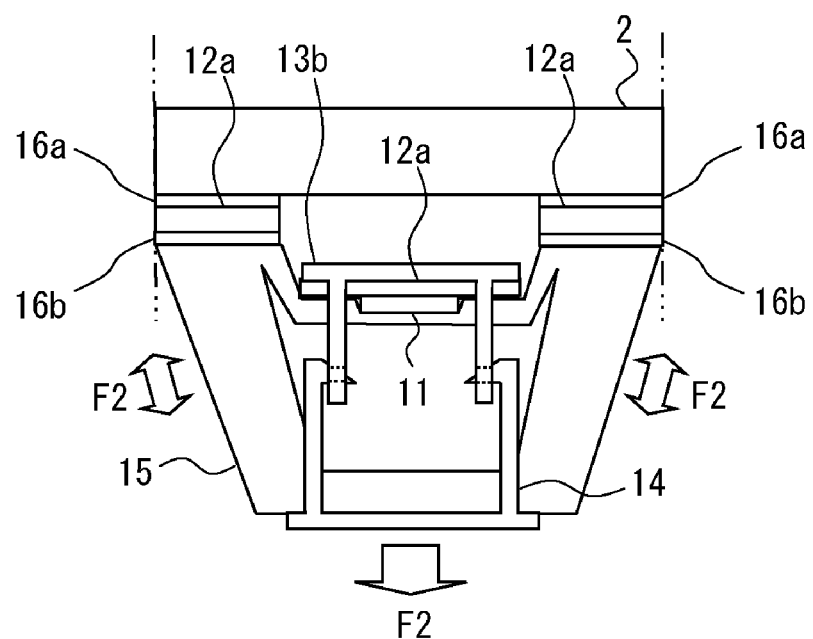
FIG. 24 is a sectional view illustrating an example of the third state of the RFID tag 1c as seen from the front.

FIG. 24 is a sectional view illustrating an example of the third state of the RFID tag 1c as seen from the front. The diagram depicts the third state that is reached through the first and second states as in Embodiment 1, i.e., where the RFID tag 1c is detached from the object of attachment 5. The components of the RFID tag 1c identical or equivalent to those of the RFID tag 1a will be designated by the same reference numerals as those of the RFID tag 1a. Description thereof will be omitted here. As compared to the RFID tag 1a, the RFID tag 1c has a destruction mechanism 13b instead of the destruction mechanism 13a.

Figure 25:
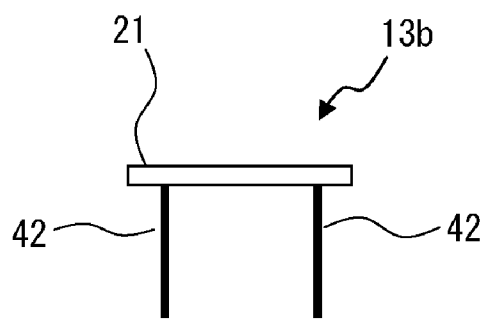
FIG. 25 is a front view illustrating an example of the configuration of a destruction mechanism 13b.

FIG. 25 is a front view illustrating an example of the configuration of the destruction mechanism 13b. The components of the destruction mechanism 13b identical or equivalent to those of the destruction mechanism 13a will be designated by the same reference numerals as those of the destruction mechanism 13a. Description thereof will be omitted here. As compared to the destruction mechanism 13a, the destruction mechanism 13b has wires 42 instead of the hooks 22.

Figure 26:
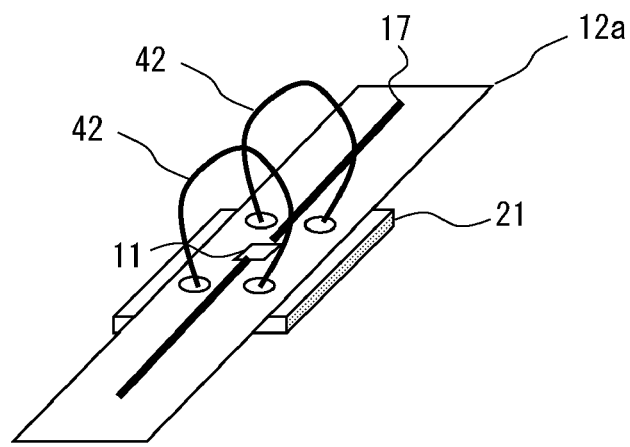

FIG. 26 is a perspective view illustrating an example of the configuration of the destruction mechanism 13b and the inlet substrate 12a. The point of view in the diagram is located at the bottom side of the inlet substrate 12a. When the RFID tag 1c is attached, the wires 42 are caught on the hooks 24 as if the hooks 22 are in the second state of Embodiment 1. The bases 21 and 23 are thereby constrained so that the distance between the bases 21 and 23 does not exceed a predetermined distance. When the RFID tag 1c is detached, the center portion and both end portions of the inlet substrates 12a undergo forces in the respective opposite directions as in the third state of Embodiment 1. The inlet substrate 12a is thus destroyed.

Embodiment 4

Now, description will be given of the configuration of an RFID tag 1d according to the present embodiment.

Figure 27:
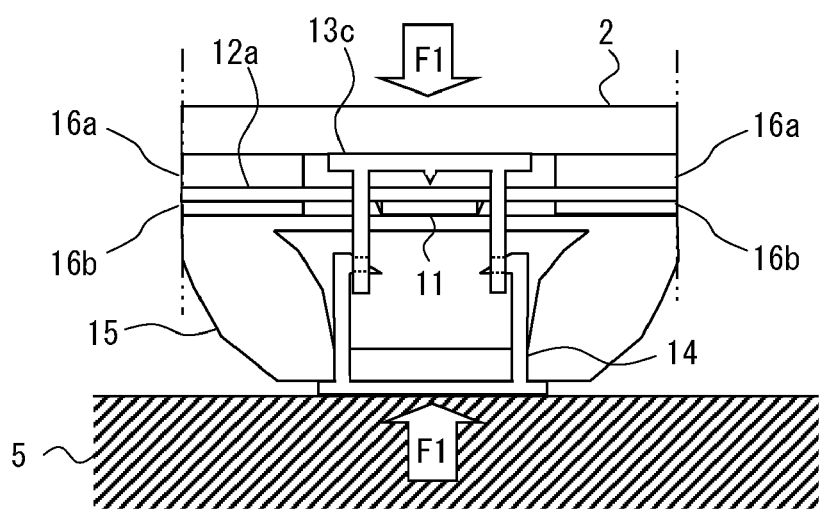
FIG. 27 is a sectional view illustrating an example of the second state of an RFID tag 1d as seen from the front.

FIG. 27 is a sectional view illustrating an example of the second state of the RFID tag 1d as seen from the front. The diagram depicts the same second state as in Embodiment 1, i.e., where the RFID tag 1d is attached to the object of attachment 5. The components of the RFID tag 1d identical or equivalent to those of the RFID tag 1a will be designated by the same reference numerals as those of the RFID tag 1a. Description thereof will be omitted here. As compared to the RFID tag 1a, the RFID tag 1d has a destruction mechanism 13c instead of the destruction mechanism 13a.

Figure 28:
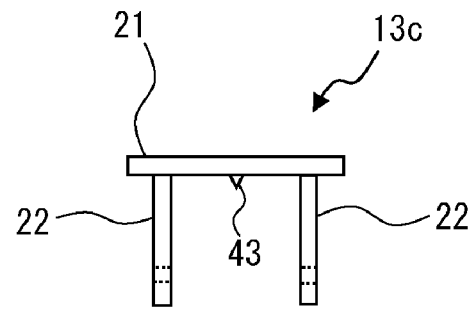
FIG. 28 is a front view illustrating an example of the configuration of a destruction mechanism 13c.

FIG. 28 is a front view illustrating an example of the configuration of the destruction mechanism 13c. The components of the destruction mechanism 13c identical or equivalent to those of the destruction mechanism 13a will be designated by the same reference numerals as those of the destruction mechanism 13a. Description thereof will be omitted here. As compared to the destruction mechanism 13a, the destruction mechanism 13c has an additional protrusion 43 on the bottom surface of the base 21. The protrusion 43 is positioned so as to be opposed to the center portion of the chip 11 across the inlet substrate 12a. The top of the protrusion 43 is directed toward the inlet substrate 12a.

Figure 29:
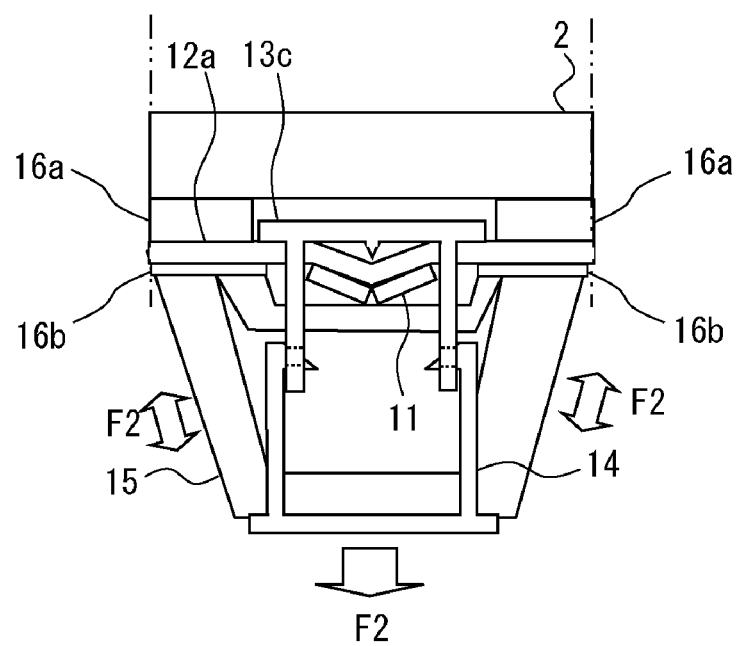
FIG. 29 is a sectional view illustrating an example of the third state of the RFID tag 1d as seen from the front.

FIG. 29 is a sectional view illustrating an example of the third state of the RFID tag 1d as seen from the front. The diagram depicts the same third state as in Embodiment 1, i.e., where the RFID tag 1d is detached from the object of attachment 5.

When the attaching band 2 is loosened to reduce the pressing force F1 as in the third state of Embodiment 1, the elastic restoring force F2 from the spacer 7, which presses both end portions of the inlet substrate 12a upward and the base 23 downward, exceeds the pressing force F1. In the meantime, the distance between the protrusion 43 and the base 23 is maintained because the bases 21 and 23 are constrained with the hooks 22 and 24 fastened to each other. Consequently, the protrusion 43 and the inlet substrate 12a undergo forces in the opposite directions, so that the top of the protrusion 43 sticks into the inlet substrate 12a to destroy the chip 11 and the inlet substrate 12a.

According to the present embodiment, the chip 11 and the inlet substrate 12a are destroyed when the RFID tag 1d attached to the object of attachment 5 is detached. This makes it possible to prevent the unauthorized use of the RFID tag 1d and the chip 11.

The first locking section corresponds to the hooks 22 or the wires 42. The second locking section corresponds to the destruction mechanism 14. The destruction section corresponds to the base 21 or the protrusion 43. The support section corresponds to the inlet substrate 12a or the inlet substrate 12b.

Once attached to an object of attachment, the RFID tags disclosed in the foregoing respective embodiments are destroyed when detached from the object of attachment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An RFID tag having an IC chip and an antenna connected to the IC chip, the RFID tag comprising:
   a spacer that has elasticity;
   a first locking section that is formed around the IC chip;
   a second locking section that is arranged in a position apart from the first locking section across the spacer, is displaced toward the first locking section and locked on the first locking section by pressing force with which the spacer is pressed, and the spacer applies reactive force against the pressing force around the IC chip via the first locking section when the pressing force is removed; and
   a destruction section on the first locking section that destroys the IC chip or the antenna with the reactive force from the spacer acting on the second locking section.

2. The RFID tag according to claim 1, further comprising a band for attaching the RFID tag to an object of attachment, and
the band produces the pressing force when fastened to the object of attachment.

3. The RFID tag according to claim 1, further comprising a support section that supports the antenna and is to be destroyed with the antenna by the destruction section.

4. The RFID tag according to claim 3, wherein the support section has a groove that helps the destroying of the destruction section.

5. The RFID tag according to claim 1, wherein the destruction section has a protrusion toward the IC chip, and
the protrusion is to be brought into contact with the IC chip to destroy the IC chip by the reactive force.

6. The RFID tag according to claim 1, wherein the reactive force is an elastic restoring force of the spacer.

7. The RFID tag according to claim 1, wherein the destruction section is arranged on a side opposite from the second locking section across the spacer.

8. The RFID tag according to claim 1, wherein the destruction section is fixed to the first locking section.

9. The RFID tag according to claim 1, wherein the destruction section is in contact with a first location of the antenna or the IC chip,
the spacer is in contact with a second location of the antenna or the IC chip, and
the reactive force displaces the first location and the second location in opposite directions.

10. The RFID tag according to claim 1, further comprising a stopper that is formed on at least either one of the first locking section and the second locking section to prevent locking between the first locking section and the second locking section, wherein
the stopper is removed before the RFID tag is attached to the object of attachment.

* * * * *